(12) United States Patent
Tamburro (10) Patent No.: US 12,063,503 B1
(45) Date of Patent: Aug. 13, 2024

(54) NATIVE MOBILE APPLICATION EXPERIENCES ON HYBRID MOBILE APPLICATIONS

(71) Applicant: Morgan Stanley Services Group Inc., New York, NY (US)

(72) Inventor: Michael Tamburro, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 204 days.

(21) Appl. No.: 17/942,630

(22) Filed: Sep. 12, 2022

(51) Int. Cl.
*H04W 12/06* (2021.01)
*G06F 9/54* (2006.01)

(52) U.S. Cl.
CPC .......... *H04W 12/068* (2021.01); *G06F 9/547* (2013.01)

(58) Field of Classification Search
CPC .............................. H04W 12/068; G06F 9/547
See application file for complete search history.

(56) References Cited

U.S. PATENT DOCUMENTS

| | | | |
|---|---|---|---|
| 2013/0219415 A1* | 8/2013 | Jeon | G06F 9/541 719/328 |
| 2014/0109115 A1* | 4/2014 | Low | G06F 9/54 719/328 |
| 2014/0337414 A1 | 11/2014 | Sojoodi et al. | |
| 2016/0248890 A1 | 8/2016 | McNamara et al. | |
| 2016/0253171 A1 | 9/2016 | Zang et al. | |
| 2017/0017386 A1 | 1/2017 | Mattson | |
| 2017/0300316 A1* | 10/2017 | Lopyrev | H04L 67/34 |
| 2019/0130750 A1* | 5/2019 | Cole | G06F 16/9577 |
| 2019/0273753 A1 | 9/2019 | Shirley et al. | |
| 2019/0384616 A1 | 12/2019 | Govindaraj | |
| 2020/0326927 A1 | 10/2020 | Lopyrev et al. | |

* cited by examiner

*Primary Examiner* — Nelson S. Giddins
(74) *Attorney, Agent, or Firm* — K&L Gates LLP (57) ABSTRACT

Automated systems and methods are presented herein for hybrid mobile apps to achieve parity with native mobile app user experiences and functionality. An exemplary system includes a mobile device running a hybrid mobile application, the hybrid mobile application comprising one or more native layers and one or more web layers, each made up of one or more native or web based tools or components respectively; the hybrid mobile application, when executed by the processor, comprises at least one app feature that improves app experiences via one or more APIs that communicate between a web layer and a native layer enabling a native mobile app user experience using one or more features or functions on at least one of the web layer and native mobile app layer.

22 Claims, 6 Drawing Sheets

NATIVE MOBILE APPLICATION EXPERIENCES ON HYBRID MOBILE APPLICATIONS

BACKGROUND

Mobile applications (or "mobile apps") are software applications to run on mobile devices, such as smartphones, tables, etc. There are different classes of mobile apps. Native apps are designed specifically for a mobile operating system, such as iOS or Android. Native apps usually provide the most secure, user-friendly, and reliable user experiences. Web apps are typically written in HTML5 or CCS and typically run through a browser. Native apps can access other resources of the mobile device, such as the contacts in the phone, the LIDAR sensor, the GPS, or the camera, for example, whereas web apps cannot. A hybrid app combines elements of both native and web apps. Like a purely native app, they can incorporate operating system features and like a web app they can also use cross-compatible web technologies. Hybrid app development, however, can miss out on key native mobile application experiences because of their non-native or non-operating system specific development tools.

SUMMARY

In a general aspect, embodiments of the present invention are directed to hybrid mobile app that makes it easier for a user of a mobile device be authenticated for a feature (or features) of hybrid mobile app. The hybrid mobile app comprises instructions to be executed by a processor of the mobile device. The hybrid mobile app comprises one or more native layers and one or more web layers. When executed by the processor, the hybrid mobile app provides at least a first app feature that utilizes an authenticator for a multifactor authentication process. The multifactor authentication process utilizes a one-time password (OTP) from the authenticator to access the first app feature. Upon the first app feature of the hybrid mobile application being invoked by a user of the mobile device, the processor of the mobile device, by executing the hybrid mobile application, is caused to customize and/or create a hidden native text field designed to accept OTP input. It also presents a non-interactive text web field on a display of the mobile device, where direct interaction with the text web field by a web keyboard is disabled. It also presents a native layer keyboard on the display of the mobile device that allows input, where the native layer keyboard is connected to the hidden native text field via a native-web layer API. The native layer keyboard is capable of displaying a suggestion button, comprising the OTP code generated by the authenticator. An interaction with the suggestion button by the user populates the hidden native text field with the OTP code. Upon a detection by the native-web layer API of the OTP code in the hidden native text field, the processor (by executing the hybrid mobile app) populates, via the native-web layer API, the text web field with the OTP code in the hidden native text field. This allows delivery of a native experience, on a hybrid mobile app, allowing the benefits of the native user experience with the developmental flexibility of the hybrid app model. These and other benefits that can be realized with embodiments of the present invention will be apparent from the description below.

FIGURES

Various embodiments of the present invention are described herein by way of example in connection with the following figures.

DESCRIPTION

Hybrid mobile applications utilize a combination of native content and layers and web content and layers. The native content and layers are built with, and depend on, tools and programming languages of the native operating system, while the web layers and content are built upon web-based technologies, tools and programming languages such as CSS and HTML to present the content. In web-based hybrid applications, most of the content is generated and presented by web-based layers that include a myriad of web content from web pages presented on, and/or encapsulated by, native components, thereby allowing web layers to function within an application framework in the operating system environment of the mobile device. A hybrid app is able to present components and content from the native mobile operating system, as well as web layers that present web-based content. These two layers of content, the native layer and the web layer, are combined in hybrid apps to provide various user experiences.

Native layers may include content from another native application or portion of a native application running and displayed on or with the hybrid app in the same display and in the backend on the same application container. The web layer may comprise any portion of a web browser, including features and functions of a web application or web site, presented on a web layer that runs on the hybrid app. The web layer content may be presented by a hybrid mobile app according to the present invention alongside, at the same time, or with the native layers. Hybrid apps are often, by default, limited to modal (or static) presentation of content, because it is difficult to display and to time the various layers, movements, animations, and actions in a manner that provides users with an authentic native mobile app experience. Because web and native technologies are quite different, it would be near-impossible to coordinate animations and transitions between the two that would be reliable and appear to be functioning correctly to the end user.

Various hybrid mobile applications, used by large numbers of users across various platforms and operating systems, are primarily web-based hybrid mobile applications. Hybrid apps of this architecture present most of their user experience through a full-screen web browser. When an experience is either better executed in a native platform technology, or not possible with web technologies, hybrid apps utilize the full power of, for example, the iOS or Android operating system of the mobile device, to render experiences—for example, an ATM Map or QR Code Scanner. In these cases, hybrid apps resort to modal (full-screen) or fixed (static) presentation of native content, which can limit the quality of the user experience.

Many mobile apps require authentication, and authentication processes often use a one-time password (OTP). An OTP is an automatically generated numeric or alphanumeric string of characters that authenticates a user for a single transaction or login session. In various aspects of the present invention, one or more features of the hybrid mobile app are only accessible after authentication. The features that require authentication could be, for example, logging onto the app, making a financial transaction, and/or accessing or changing confidential or personal information. However, unlike in fully native apps, where the OS systems may automatically provide OTP codes that appear on top of a keyboard, such as a form accessory bar 230 shown in FIG. 2, a hybrid app that relies on a combination of native and web content cannot utilize these native functionalities. The present invention provides, in various embodiments, for seamless integration of native content (also referred to herein as a "native layer" or "native layer content") with web-based hybrid apps (also referred to herein as a "web layer" or "web layer content"), and allows native content to co-exist with web content and rendered such that the content is presented to the user of the mobile device at a high quality. Systems and methods are presented herein to allow a user of the mobile device to be able to naturally interact with either technology or content layer on the same screen of the mobile device as if it was one technology acting similarly as a native application.

Figure 1:
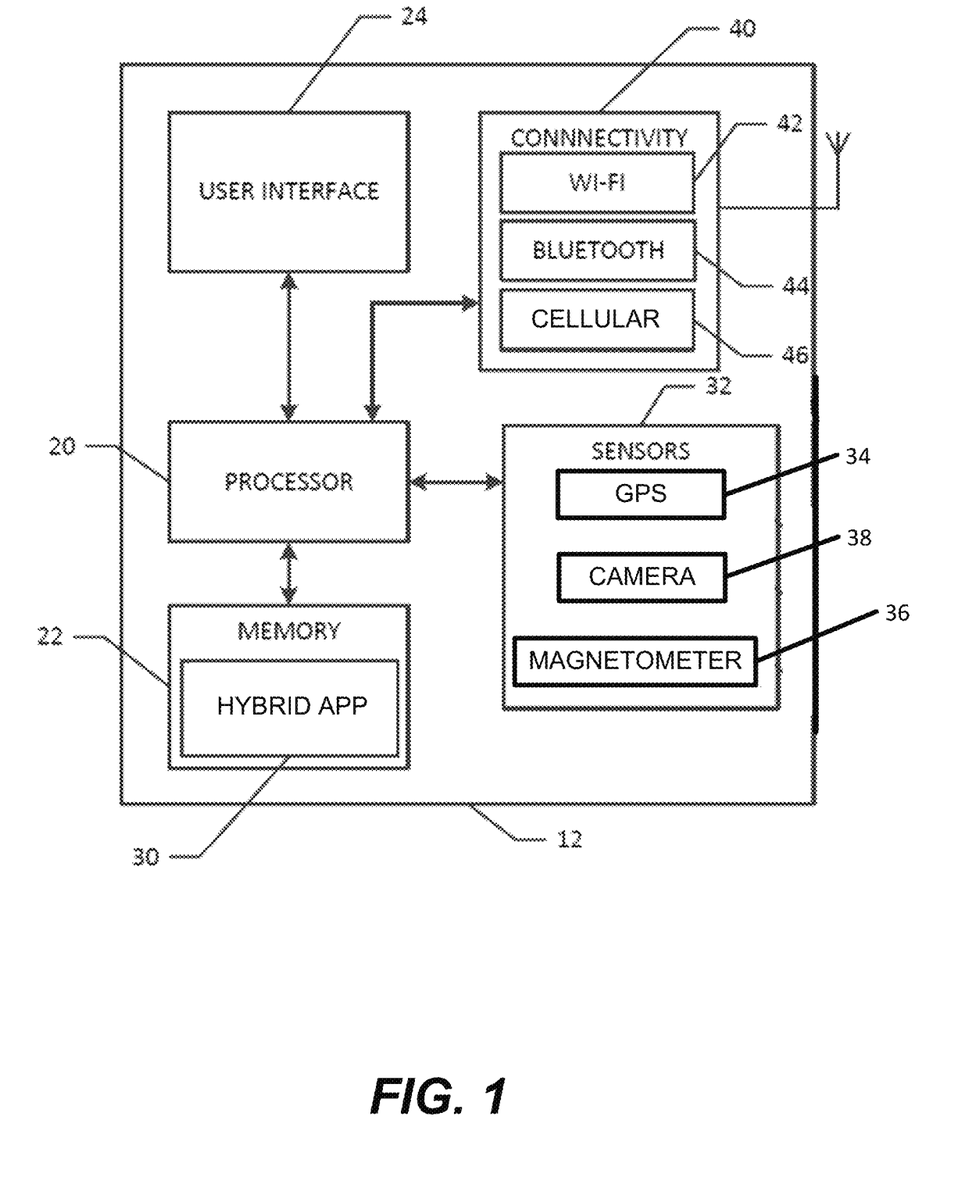
FIG. 1 is a block diagram of the mobile device according to various embodiments of the present invention.

FIG. 1 is a block diagram of the mobile device 12 according to various embodiments. The mobile device 12 may be a smartphone, a tablet computer, a wearable computer (such as smart glasses or a smart watch), or any other suitable mobile computing device. FIG. 1 illustrates some of the components that in at least one example may be employed by or included as part of the mobile device 12. The mobile device 12 includes, for example, at least one processor 20, at least one memory unit 22, and a user interface 24. The memory 22 may include internal Random Access Memory (RAM), Read Only Memory (ROM) and/or flash memory, as well as optional removable storage. The RAM may be, for example, LPDDR2 DRAM; the ROM may include one or more memory chips; the flash memory may include a SSD or emmc flash memory; and the optional removable storage may include a form of microSD card. One or more of these memory units may store the mobile hybrid app 30 of the present invention, which is a software application that is executed by the processor 20, which causes the processor 20 to perform the functions and operations programmed by the hybrid app 30. The user interface 24 may include a display (such as a LCD, LED, OLED display), a touch interface, and/or haptic systems that are common in today's mobile devices for allowing users to view and input information via the mobile device's display.

The mobile device 12 may also include various sensors 32 that are in communication with the processor 20, including a GPS receiver (or chip) 34 for calculating GPS coordinates (in an assisted GPS process, for example) and/or receiving GPS position coordinates for the mobile device 12. The mobile device 12 may also include a camera system 38 that captures digital images and/or video. The camera system 38 may comprise one or more cameras. The camera(s) of the camera system 38 may comprise, for example, CCD or CMOS sensors. The mobile device 12 may also include a magnetometer 36 and/or other inertial sensors, such as accelerometers and gyroscopes, to detect and quantify motion by the mobile device 12.

As shown in FIG. 1, the illustrated mobile device 12 also includes a wireless connectivity module 40, which may, for example, include any or all of a WiFi (IEEE 802.11) module 42, a Bluetooth module 44, a cellular network interface (e.g., 4G LTE or 5G) 46, and/or any other suitable wireless interface. The mobile device 12 connects to the internet, for example, wirelessly via one of these interfaces. In this manner, the mobile device 12 can connect to an application server for the mobile app 30. For the sake of simplicity, other conventional components of the mobile device 12 are not shown in FIG. 1, such as the power management system, the battery, level translators, the audio system, codecs, USB ports, etc.

Figure 2:
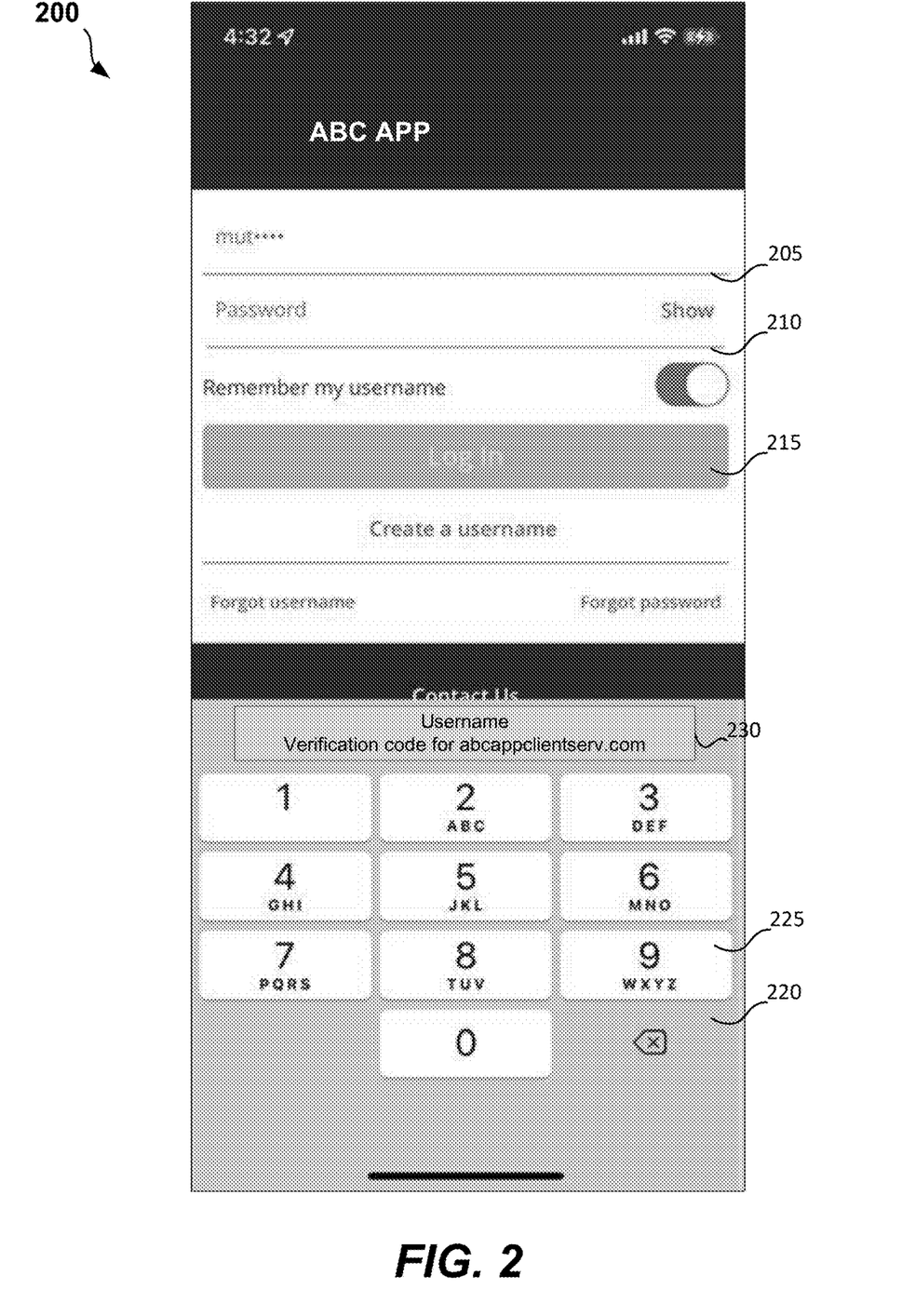
FIG. 2 illustrates a user interface of an authentication feature of a hybrid mobile application as displayed to a user to mimic a native application.

FIG. 2 illustrates a user interface of the hybrid mobile application 30 as displayed to a user of the mobile device 12 to mimic a native application according to various embodiments of the present invention. FIG. 2 presents one example of the technologies provided herein wherein a user interface 200 combines both native content and web content and provide the user of the mobile device 12 with a unified experience using a combination of native layers and web content on the screen of the mobile device 12. In this example user interface 200, web content is displayed which includes a user name web field 205, a password web field 210, and log in button 215, all of which form parts of the web layer of the hybrid app 30 that is displayed on the UI 200 to the user. In the illustrated embodiment, native content is also displayed on UI 200, including a native layer keyboard 220 and a native layer form accessory bar (also referred to herein as a "suggestion button", "autofill bar", or "autofill button") 230. The native layer keyboard 220 includes keys 225 allowing a user to type into the native layer keyboard 220 to fill a native text field, which is hidden by the hybrid app so that it is not shown to the user on UI 200. In various embodiments of the current invention, the hidden native text field is tagged and used to pull up the native keyboard, while the web fields 205, 210 and log-in button 215 are simultaneously disabled on the UI 200. In several aspects, direct user interaction with web fields 205, 210 and/or log-in button 215 through touch, voice, or keyboard inputs are disabled when the native layer keyboard 220 is displayed, even if a user is able to type into keyboard 220, via keys 225, or press the suggestion button 230 in the native layer. All the results of user interaction with these components of the native layer are managed by a native-web layer API, and are usually received by the hidden text field rather than any web field onscreen. Depending on the received input to the native-web layer API, the API can output results or partial results into any of the fields of the web layer including into one or more of user name web field 205, password web field 210, or submit forms or received inputs through the log in button 215.

Figure 3:
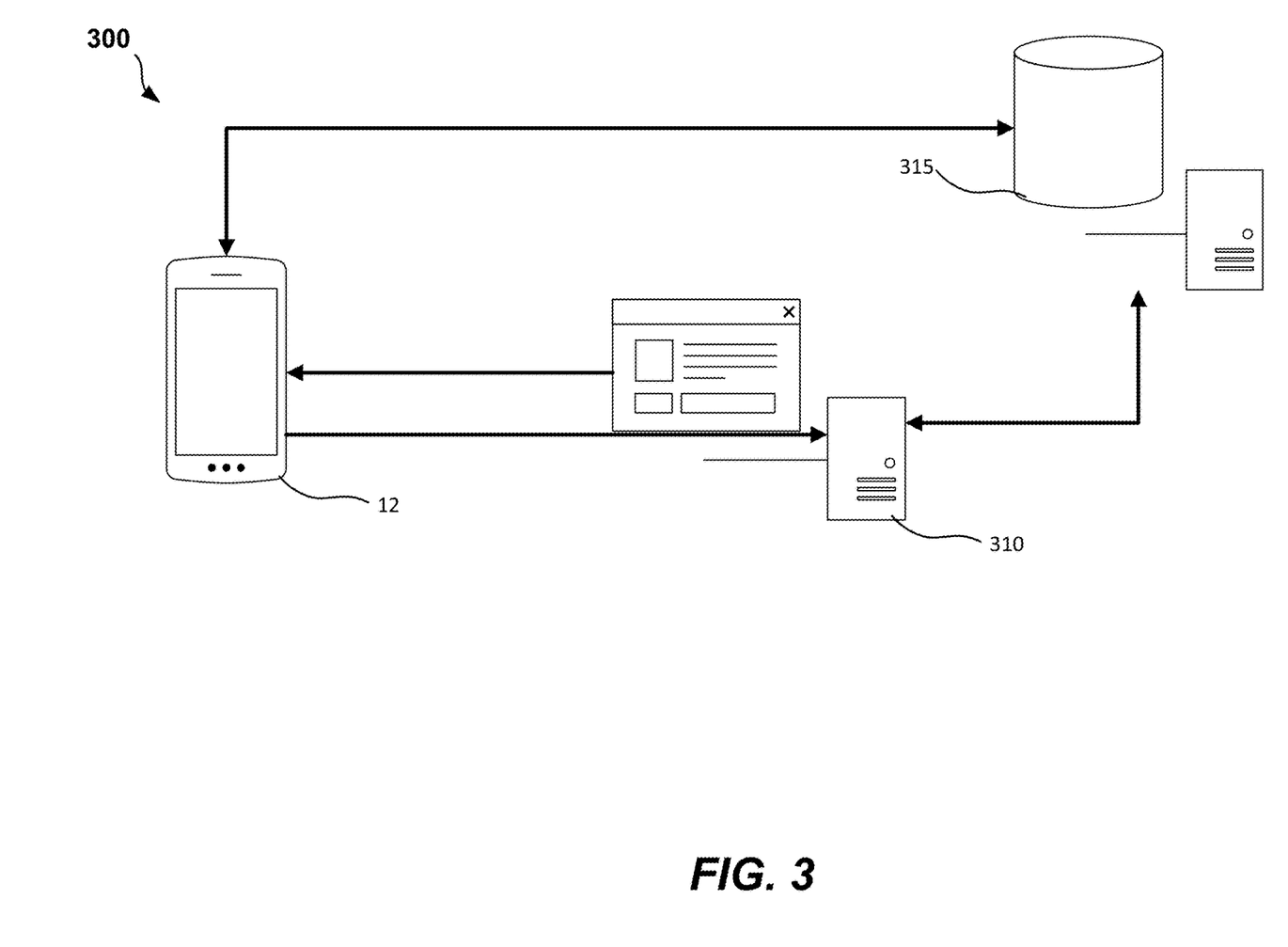
FIG. 3 illustrates the basic components of a system to provide a native user experience on a hybrid mobile app.

FIG. 3 illustrates the basic components of a system 300 to provide a native user experience for the hybrid mobile app 30 and facilitate performance of the methods disclosed herein. System 300 includes the mobile device 12, which includes the user interface 200 and the hybrid app 30. Interaction with the mobile device 12 and any of the web or native layers of the hybrid app 30 on the user interface 200 may be driven by a native-web layer API 310 that determines which inputs from one layer may interact with, and how it interacts with, another layer, and whether any inputs may be submitted or sent to an external or application server 315. Such inputs could be, for example, usernames or passwords or other authentication tokens or security credentials, or from one layer to another. In various examples, a user may type into a displayed native keyboard such as native keyboard 220, and each keystroke on keys 225 is input into a hidden native text field, which is detected by native-web layer API 310, which then determines whether the input should be used to populate a web field such as username or password web fields 205 and 210 respectively, or whether to directly send the information to external or application server 315. In various aspects, the API 310 fills a web-field 205, 210 and then submits it via log-in button 215 to direct the mobile device 12 to send the authentication information directly to application server 315 and log in or access a feature of the hybrid mobile app 30.

Figure 4:
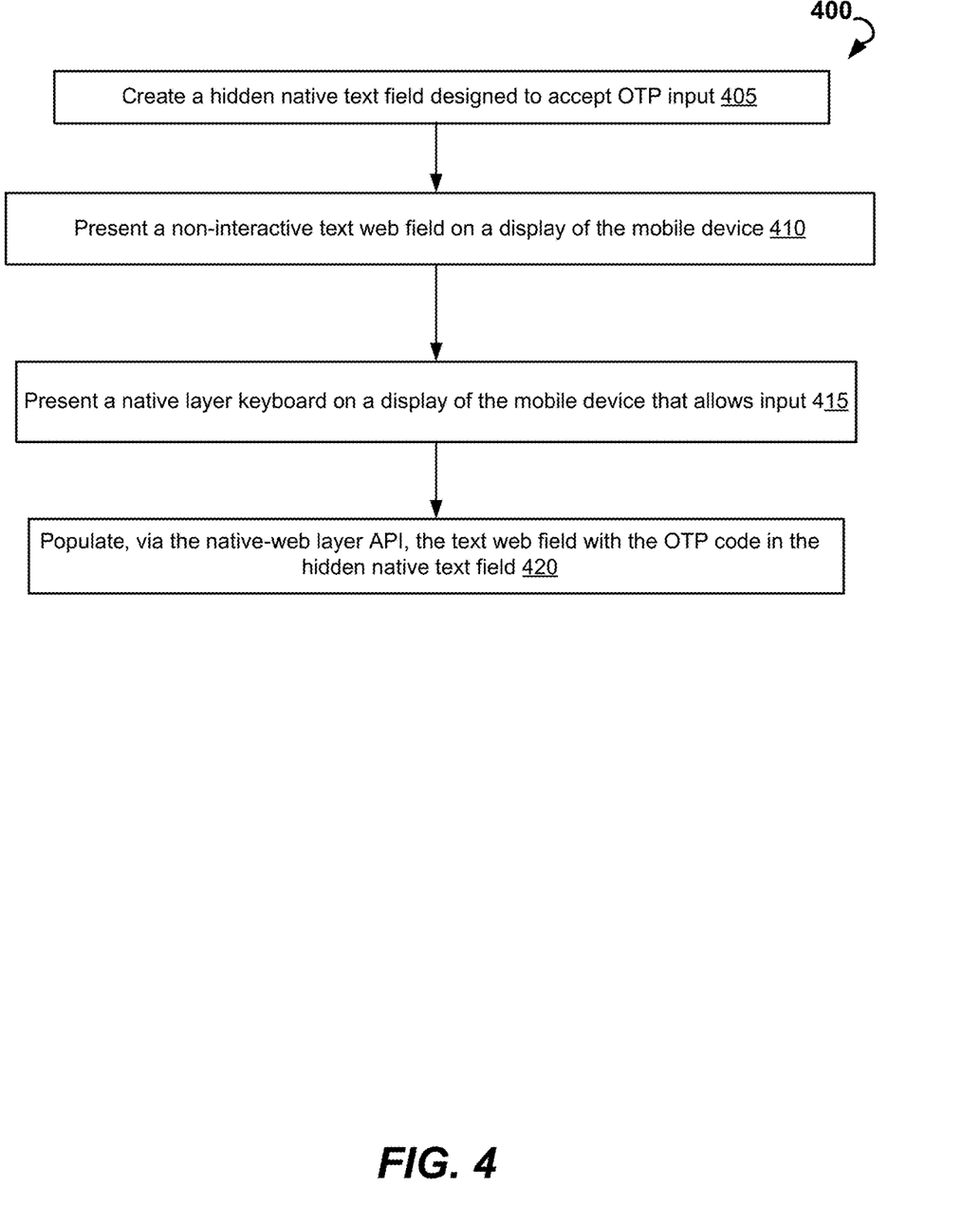
FIG. 4 is a flow chart of a process to provide a native experience on a hybrid app performed by the system of FIG. 1 according to various embodiments of the present invention.

FIG. 4 is a flow chart of a process 400 performed by the hybrid mobile app 30 of the mobile device 12 to provide a native experience according to various embodiments of the present invention. In several aspects, a user interface such as UI 200, FIG. 2, is displayed to a user of the mobile device 12. The processor 20, executing the hybrid app 30 customizes, at step 405, a hidden native layer text field that is able to receive an input, such as an input of a one-time password ("OTP"), other string, or code. The hidden native layer text field is created at application startup when the view controller housing the web app is created. The native layer text field may be hidden, or pulled to the side of the screen outside of view. In several aspects, the customizing of the hidden native layer text field at step 405 automatically pulls up a native keyboard 220 on the UI 200 by default. In various aspects the process 400 also presents, at step 410, a non-interactive text web field on the user interface to be displayed by the mobile device. At least one text web field may be displayed, but in various aspects, multiple web fields can be displayed such as, for example, the username web field 205 and/or the password web field 210, FIG. 2. However, user interaction with the web fields, whether by touching the screen of the mobile device, or via a web keyboard may be restricted, for example by hiding the web keyboard, or disabling direct interaction with the web field(s) to avoid pulling up a web keyboard (as opposed to native keyboard 220), or completely disabling the web fields to avoid undue or unnecessary interaction between web and native elements or layers, by virtue of the native keyboard 220 being connected to a separate native field such as the hidden native text field.

The process 400 may present, at step 415, a native layer keyboard 220, which accepts user input, on the display of the mobile device 12. As shown in FIG. 2, the keyboard 220 may include keyboard keys 225, and even a form accessory bar 230. The native layer keyboard 220 is presented on the screen simultaneously along with web layers that may include the above-described, exemplary web fields 205, 210, 215, but the native keyboard 220 is not connected to a web layer. Instead, the native keyboard 220 may be coupled or connected with the hidden text field created at step 405. This means that the hidden text field may accept individual keystrokes or any other input via the native keyboard 220, such as a complete code or OTP provided by the suggestion button or form accessory bar 230.

The native-web layer API 310 (see FIG. 3) may manage the interaction of inputs provided by a user, such as keyboard inputs via individual keystrokes on keys 225 (see FIG. 2). Another input may be the input of clicking or touching the suggestion button 230. And another input may in various embodiments be automatically detected and deployed or pasted by the native-web layer API. The input is sent to the hidden native text field created at step 405, where it is received by the native-web layer API. In several aspects, the native-web layer API may populate, at step 420, a text web field with the full or partial OTP code received from the native layer keyboard 220. Preferred aspects may include three API outputs—"progress", "success" and "error"—, at least one of which may conduct the populating step 420 depending on the input received "Progress" sends "incomplete" OTP codes, that are received by the native-web layer API at the native hidden text field for, for example, the individual keystrokes of keys 225 as the user is typing, and sends them to populate at step 420 one of the text web fields displayed on the mobile device, such as the password web field 210 or any other suitable web field. For example, if the API received individual keystrokes and outputs "progress," the API may transmit each clicked or pressed keystroke it receives to a web field, which may display onscreen the alphanumeric characters corresponding to the keystrokes.

The native-web layer API's "success" output can send either a complete code to populate, at step 420, a web field, or signals the closure/minimization of the keyboard or hybrid app 30 by the user. The "success" output may also be triggered by a user clicking the suggestion button or form accessory bar 230, which transmits or inputs a full code to a connected hidden native text field. The OTP code provided to the form accessory bar is provided generally by the operating system, via inbuilt native authentication OTP code retrieval methods, such an an authenticator on the mobile device. The "success" output may also be triggered by the pasting of an OTP code by the native-web layer API, or by it automatically detecting and/or retrieving a code from a paste buffer of the mobile device 12. The "success" output may transmit the full received code to a native layer, or if the API determines, to a web layer, or submit it to an application server (e.g., application server 315 in FIG. 3) directly. The API may also have an "error" output that is reserved for system errors.

Figure 5:
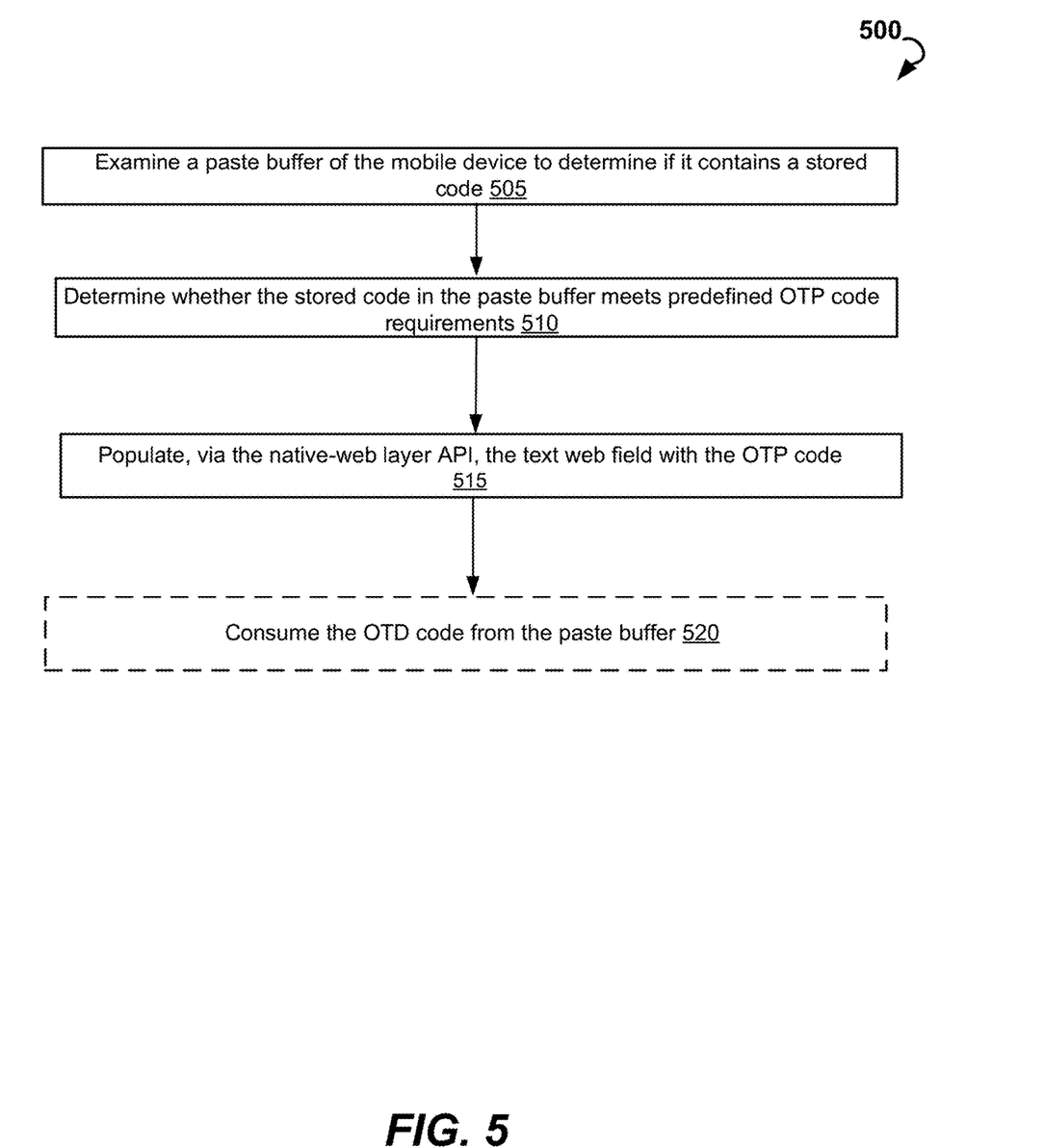
FIG. 5 is a flow chart of another process to provide a native experience on a hybrid app performed by the system of FIG. 1 according to various embodiments of the present invention.

FIG. 5 is a flow chart of another process 500 that can be performed with the mobile device 12 to provide a native experience with the hybrid app 30 according to various embodiments of the present invention. While any of the steps of process 500 may be undertaken individually or in combination with each other in any given order, in several aspects any one of steps 405-420 from FIG. 4 may be deployed, and any of the steps from process 500 may be added or combined with them in any given order. Process 500 may be undertaken by a designated program, script, application, or API such as the native-web layer API, which may examine, at step 505, a paste buffer or clipboard of the mobile device 12 (such as of the operating system of the mobile device) via a regex for example, to determine whether the paste buffer contains any stored codes that may resemble that of an OTP code. Examining 505 the paste buffer may in several aspects be undertaken or repeated when the hybrid app returns from the background, or is pulled from running in the background, and is not limited to it being undertaken when the hybrid app starts. In these aspects the hybrid app may anticipate that a user may have left the app to open an authenticator, to copy the authenticator code and thus may undertake step 505 of examining or re-examining the paste buffer. If one or more stored codes are detected by the examining at step 505, the process 500 may continue by determining, at step 510, whether any of the stored codes meet the requirements of multi-factor authentication codes/passwords or one-time passwords. These requirements may include for example a stored numerical code limited to a certain length such as a 6-digit numerical code. If the process 500 determines that one of the stored codes meets the requirements of an authentication code or OTP, it then automatically pastes, at step 515, the code into the web field for this code input without any user interaction. In various embodiments, the web field contents may then be submitted to the application server 315 with all the relevant information including user login information and OTD passwords and any other required credentials.

Process 500 may begin, be undertaken, or be triggered by the hybrid app 30 being opened, executed, or pulled up by the user. Process 500 may also be triggered whenever a specific feature (such as seeking to perform a financial transaction with the mobile app 30 or to change an account setting for the mobile app 30) or portion of the hybrid app 30 is activated; and/or when a portion of the hybrid app is displayed on the mobile device to a user. In various embodiments once the code is pasted at step 515 into the relevant web field, the code may then optionally be consumed at step 520 so that it is removed from the paste buffer, or so that it is marked as already used to avoid duplication or repeat usages of the code by this or any other process. In several aspects of process 500, instead of at step 515 pasting the code or OTP code into a web field it, may be directly sent by the native-web layer API to an application or external server 315 along with other information such as user information to allow the use or access by the user of a feature of the mobile hybrid app.

Figure 6:
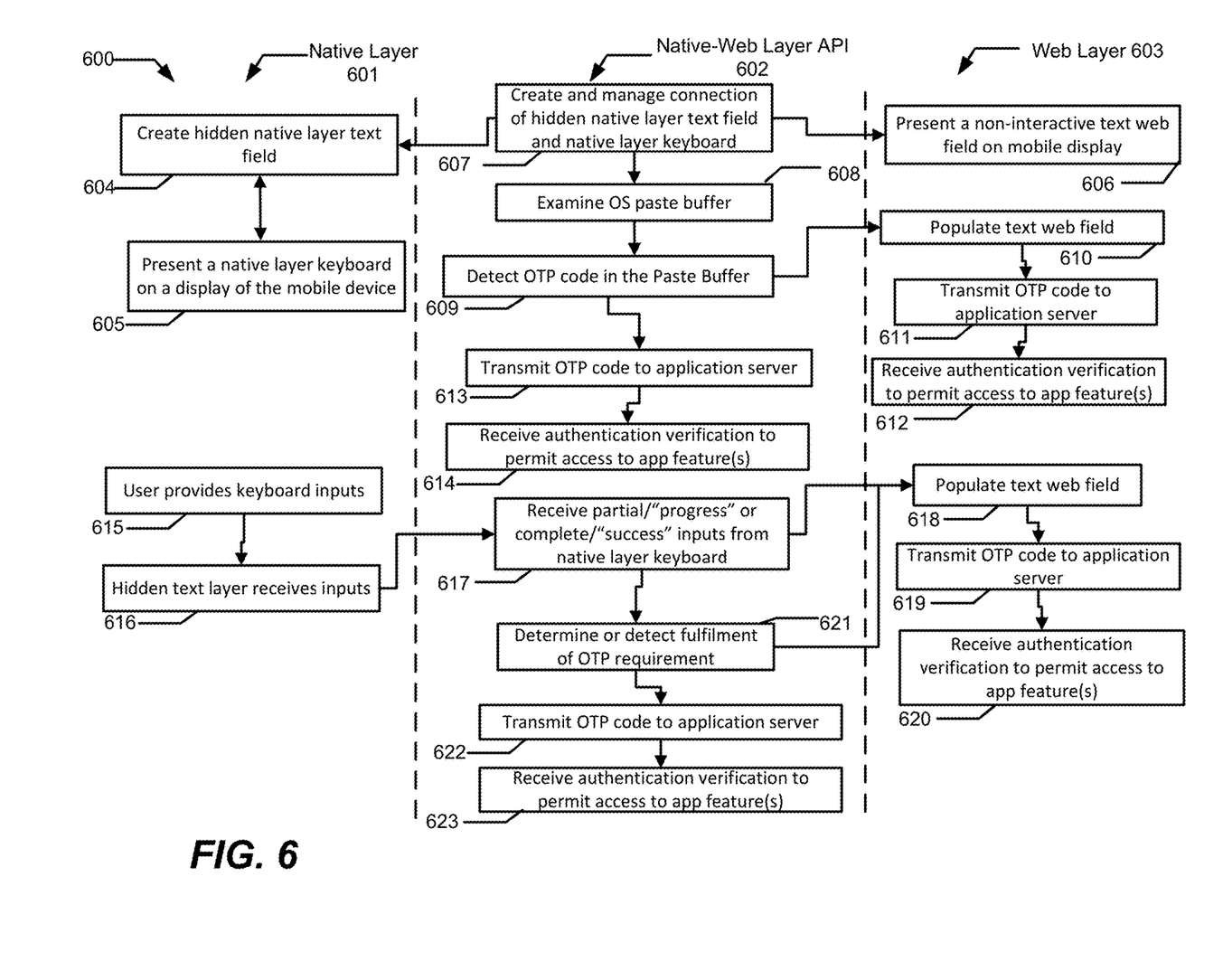
FIG. 6 presents a diagrammatical illustration of the relationship between various components of a system undertaking the various methods for a hybrid mobile app as described herein.

FIG. 6 presents a diagrammatical illustration 600 of the relationship between various components of a system undertaking the various methods for the hybrid mobile app 30 according to several aspects disclosed herein. The diagram 600 includes three components of the system described in this disclosure: the native layer 601, the native-web layer API 602, and the web layer 603. A hidden text field may be created at step 604 in the native layer, and a native layer keyboard may be displayed or presented at step 605 to the user of the mobile device. In several embodiments the hidden native layer text field is created upon the application starting, and step 604 comprises customizing the hidden native layer text field to allow it to accept OTP input. In most embodiments, the native layer keyboard and the hidden text field are coupled or connected or otherwise operationally linked by the underlying or native operating system of the mobile device, and in other aspects, by a native-web layer API 602 such as native-web layer API 310, FIG. 3. In several aspects at least one web field, preferably a text web field, may be presented by the web layer at step 603. The connection or interaction between the text web field and the hidden text field may be created at step 607 and managed by the native-web Layer API 602. Upon each or any instance of opening, starting, executing, or pulling up the hybrid app, from closed or minimized states for example, the native-web layer API 602 may examine at step 608 the paste buffer or clipboard (e.g., of the operating system), and if it detects at step 609 copied or stored OTP code(s) in the paste buffer, by for example determining that the stored codes meet certain requirements, it can do one of several things. For example, it can automatically populate at step 610 a suitable or relevant web field in the web layer 603, which can then transmit at step 611 the OTP code to an application server, by for example submitting the OTP code or passcode, and/or combination(s) of the OTP code and other information such as a username to authenticate the user, or access a feature that requires OTP code validation. Upon verification by the application server, the authentication may be received at step 612 directly via a web service or connection in the web layer to authenticate the user allowing them to use a feature of the hybrid app. In several other aspects, once the stored code is detected at step 609 and determined to meet the requirements of an OTP code, it may then be directly transmitted at step 613 to the application server from the native-web layer API 602. The native-web layer API 602 may then receive at step 614 authentication verification or validation from the application server to permit the user to access the feature of the hybrid app that required authentication by the OTP code.

In several aspects, if no code is stored or copied in the paste buffer, or no code that meets the requirements of an OTP code, or other relevant verification, or authentication mechanism is detected by the native-web layer API 602 in the paste buffer, the native-web layer API 602 will listen or wait for inputs from the native layer keyboard 601. Native layer keyboard 601 displayed on the user interface, for example user interface 200, FIG. 2, may be used by the user of the mobile device to either type in an OTP code. The native-web layer API 602 may also listen or wait for a user click or interact with form accessory bar 230, FIG. 2, that can appear, for example, on top of the native keyboard 220 with an already provided OTP code from an operating system. This code may be transmitted as a complete code input upon a user clicking the button 230 and the code provided to the native layer hidden text field as a complete OTP code. The hidden text field receives at step 616 the input produced by the native keyboard whether as individual keystrokes or one complete code input from a suggestion autofill accessory bar button. Upon transmission and receipt of keyboard inputs by the hidden text field layer 601, the inputs are also received at step 617 by the native-web layer API 602 connected to it as either as a "progress" output denoting that portions of an OTP code are received in several separate steps, i.e., when several keys/keystrokes are being input individually and separately when a user is typing on the native keyboard, or as a "success" output meaning that the full OTP code was received by the native-web layer API at one time, from an autofill accessory bar or suggestion button for example. The API native-web layer may populate at step 618 the text web field with the received progress output as each keystroke is received, or it may wait until all the keyboard inputs are received before populating the text web field. On a "success" output where the full complete code is received 617 at once, the native-web layer API 602 may populate at step 618 the web text field immediately with the full OTP code. In all these steps, when the web text field is populated it may be displayed on the screen to the user, and when it is displayed it may be displayed either in real-time or with a delay depending on the specific aspect. The OTP code may be transmitted at step 619 by the web text field to an application server for authentication or validation, which then in turn authenticate or allow access to a feature of the hybrid app that required the OTP code.

In some aspects, once a "progress" or "complete" output is received at step 617 by the native-web layer API 602 from the native layer keyboard, the native-web layer API 602 detects or determines at step 621 that requirements for an OTP code are fulfilled, for example by meeting a certain number of digits or alphanumeric inputs or the like, then it may directly transmit at step 622 the OTP code to the application server without going through the web forms or web layer 603. The native-web layer API 602 may then receive at step 623 validation or authentication, from the application server, of the code and any other information that was transmitted with it to the application server to allow a user to access an application feature that required the OTP code.

Computer program code for carrying out operations for aspects of the present technology may be written in any combination of one or more programming languages, including an object oriented programming language such as Objective-C, Swift, TypeScript, Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A mobile device comprising: a wireless interface; a processor in communication with the wireless interface; and a memory in communication with the processor, the memory comprises a hybrid mobile application, wherein: the hybrid mobile application comprises instructions to be executed by the processor; the hybrid mobile application comprises one or more native layers and one or more web layers; the hybrid mobile application, when executed by the processor, comprises at least a first app feature that utilizes an authenticator, for a multifactor authentication process, wherein the multifactor authentication process utilizes a one-time password (OTP) from the authenticator to access the first app feature; and upon the first app feature of the hybrid mobile application being invoked by a user, the processor, by executing the hybrid mobile application, is caused to: customize a hidden native text field to accept OTP input; present a non-interactive text web field on a display of the mobile device, wherein direct interaction with the text web field by a web keyboard is disabled; present a native layer keyboard on a display of the mobile device that allows input, wherein the native layer keyboard is connected to the hidden native text field via a native-web layer API, wherein the native layer keyboard is capable of displaying a suggestion button, comprising an OTP code generated by an authenticator, wherein an interaction with the suggestion button populates the hidden native text field with the OTP code; and upon a detection by the native-web layer API of the OTP code in the hidden native text field, populate, via the native-web layer API, the text web field with the OTP code in the hidden native text field.

Clause 2. The mobile device of Clause 1 wherein the processor, by executing the hybrid mobile application, is further caused to: upon a determination by the native-web layer API, that the text web field is populated by the OTP code, pass the OTP code via a web-server API, to an application server for the hybrid mobile application; and upon a determination by the application server that the OTP code satisfies the multifactor authentication process, permit the user to use the first app feature of the hybrid mobile application.

Clause 3. The mobile device of any of Clauses 1-2 wherein the processor, by executing the hybrid mobile application, is further caused to: examine a paste buffer of the mobile device to determine if it contains a stored code; upon a determination that the paste buffer contains a stored code, determine whether the stored code in the paste buffer meets predefined OTP code requirements; and upon a determination that the stored code is the OTP code that meets the predefined OTP code requirements, populate, via the native-web layer API, the text web field with the OTP code.

Clause 4. The mobile device of any one of Clauses 1-3, wherein the processor, by executing the hybrid mobile application, is further caused to: upon detection of the OTP code in the hidden native text field, consume the OTP code from the paste buffer, to disable it from being pasted again.

Clause 5. The mobile device of any one of Clauses 1-4 wherein the processor, by executing the hybrid mobile application, is further caused to: responsive to the determining that the paste buffer does not contain a stored code, or that the stored code does not meet the predefined OTP code requirements, detect at least one key press input on the native layer keyboard; receive the at least one key press input in the hidden native text field, via the native-web layer API; and populate, via the native-web layer API, the text web field with the at least one key press input received by the hidden native text field.

Clause 6. The mobile device of any one of Clauses 1-5 wherein the first app feature comprises at least one of a user application login, a transaction request, and changing user login IDs or passwords.

Clause 7. The mobile device of any one of Clauses 1-6, wherein the OTP code comprises at least one of a numeric code, an alphanumeric code, and a 6-digit numeric code.

Clause 8. The mobile device of any one of Clauses 1-7, wherein the authenticator comprises at least one of an inbuilt native authenticator, and a third party authenticator.

Clause 9. The mobile device of any one of Clauses 1-8, wherein the authenticator automatically provides the native layer keyboard the OTP code to be displayed by the suggestion button.

Clause 10. The mobile device of any one of Clauses 1-9 wherein the hidden native text field is tagged to enable it to accept an input of the OTP code.

Clause 11. A method for native and web layer integration to authenticate a user to access a first app feature of a hybrid mobile application comprising: customizing a hidden native text field designed to accept OTP input; presenting a non-interactive text web field on a display of a mobile device, wherein direct interaction with the text web field by a web keyboard is disabled; presenting a native layer keyboard on a display of the mobile device that allows input, wherein the native layer keyboard is connected to the hidden native text field via a native-web layer API, wherein the native layer keyboard is capable of displaying a suggestion button, comprising an OTP code generated by an authenticator, wherein an interaction with the suggestion button populates the hidden native text field with the OTP code; and upon a detection by the native-web layer API of the OTP code in the hidden native text field, populating, via the native-web layer API, the text web field with the OTP code in the hidden native text field.

Clause 12. The method of Clause 11 further comprising: upon a determination by the native-web layer API, that the text web field is populated by the OTP code, passing the OTP code via a web-server API, to an application server for the hybrid mobile application; and upon a determination by the application server that the OTP code satisfies a multifactor authentication process, permitting the user to use the first app feature of the hybrid mobile application.

Clause 13. The method of any one of Clauses 11-12, further comprising: examining a paste buffer of the mobile device to determine if it contains a stored code; upon a determination that the paste buffer contains a stored code, determining whether the stored code in the paste buffer meets predefined OTP code requirements; and upon a determination that the stored code is the OTP code that meets the predefined OTP code requirements, populating, via the native-web layer API, the text web field with the OTP code.

Clause 14. The methods of any one of Clauses 11-13, further comprising: upon detection of the OTP code in the hidden native text field, consuming the OTP code from the paste buffer, to disable it from being pasted again.

Clause 15. The method of any one of Clauses 11-14, further comprising: responsive to the determining that the paste buffer does not contain a stored code, or that the stored code does not meet the predefined OTP code requirements, detecting at least one key press input on the native layer keyboard; receiving the at least one key press input in the hidden native text field, via the native-web layer API; and populating, via the native-web layer API, the text web field with the at least one key press input received by the hidden native text field.

Clause 16. The method of any one of Clauses 11-15, wherein the first app feature comprises at least one of a user application login, a transaction request, and changing user login IDs or passwords.

Clause 17. The method of any one of Clauses 11-16, wherein the OTP code comprises at least one of a numeric code, an alphanumeric code, and a 6-digit numeric code.

Clause 18. The method of any one of Clauses 11-17, wherein the authenticator comprises at least one of an inbuilt native authenticator, and a third party authenticator.

Clause 19. The method of any one of Clauses 11-18, wherein the authenticator automatically provides the native layer keyboard the OTP code to be displayed by the suggestion button.

Clause 20. The method of any one of Clauses 11-19, wherein the hidden native text field is tagged to enable it to accept an input of the OTP code.

Clause 21. A non-transitory computer-readable storage medium having embodied thereon a program, the program executable by a processor to perform a method for native and web layer integration to authenticate a user to access a first app feature of a hybrid mobile application comprising: customizing a hidden native text field designed to accept OTP input; presenting a non-interactive text web field on a display of a mobile device, wherein direct interaction with the text web field by a web keyboard is disabled; presenting a native layer keyboard on a display of the mobile device that allows input, wherein the native layer keyboard is connected to the hidden native text field via a native-web layer API, wherein the native layer keyboard is capable of displaying a suggestion button, comprising an OTP code generated by an authenticator, wherein an interaction with the suggestion button populates the hidden native text field with the OTP code; upon a detection by the native-web layer API of the OTP code in the hidden native text field, populating, via the native-web layer API, the text web field with the OTP code in the hidden native text field; and upon a determination by the native-web layer API, that the text web field is populated by the OTP code, passing the OTP code via a web-server API, to an application server for the hybrid mobile application.

Clause 22. The non-transitory computer-readable storage medium of Clause 21, wherein the program executable by the processor to perform the method further comprises: examining a paste buffer of the mobile device to determine if it contains a stored code; upon a determination that the paste buffer contains a stored code, determining whether the stored code in the paste buffer meets predefined OTP code requirements; upon a determination that the stored code is the OTP code that meets the predefined OTP code requirements, populating, via the native-web layer API, the text web field with the OTP code; upon detection of the OTP code in the hidden native text field, consuming the OTP code from the paste buffer, to disable it from being pasted again; responsive to the determining that the paste buffer does not contain a stored code, or that the stored code does not meet the predefined OTP code requirements, detecting at least one key press input on the native layer keyboard; receiving the at least one key press input in the hidden native text field, via the native-web layer API; populating, via the native-web layer API, the text web field with the at least one key press input received by the hidden native text field; and upon a determination by the application server that the OTP code satisfies a multifactor authentication process, permitting the user to use the first app feature of the hybrid mobile application.

The foregoing detailed description includes references to the accompanying drawings, which form a part of the detailed description. The drawings show illustrations in accordance with exemplary aspects. These example aspects, which are also referred to herein as "examples," are described in enough detail to enable those skilled in the art to practice the present subject matter.

The various aspects described above, are presented as examples only, and not as a limitation. The descriptions are not intended to limit the scope of the present technology to the forms set forth herein. To the contrary, the present descriptions are intended to cover such alternatives, modifications, and equivalents as may be included within the scope of the present technology as appreciated by one of ordinary skill in the art.

While specific aspects of, and examples for, the system are described above for illustrative purposes, various equivalent modifications are possible within the scope of the system, as those skilled in the relevant art will recognize. For example, while processes or steps are presented in a given order, alternative aspects may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The aspects can be combined, other aspects can be utilized, or structural, logical, and electrical changes can be made without departing from the scope of what is claimed. It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.).

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited in the form disclosed. Many modifications and variations will be apparent to those of ordinary skill in the art without departing from the scope of the claimed subject matter. Exemplary aspects were chosen and described to best explain the principles of the present technology and its practical application, and to enable others of ordinary skill in the art to understand the various aspects of the present disclosure with various modifications as are suited to the particular use contemplated.

What is claimed is:

1. A mobile device comprising:
   a wireless interface;
   a processor in communication with the wireless interface; and
   a memory in communication with the processor, the memory comprises a hybrid mobile application, wherein:
      the hybrid mobile application comprises instructions to be executed by the processor;
      the hybrid mobile application comprises one or more native layers and one or more web layers;
      the hybrid mobile application, when executed by the processor, comprises at least a first app feature that utilizes an authenticator, for a multifactor authentication process, wherein the multifactor authentication process utilizes a one-time password (OTP) from the authenticator to access the first app feature; and
      upon the first app feature of the hybrid mobile application being invoked by a user, the processor, by executing the hybrid mobile application, is caused to:
         customize a hidden native text field to accept OTP input;
         present a non-interactive text web field on a display of the mobile device, wherein direct interaction with the text web field by a web keyboard is disabled;
         present a native layer keyboard on a display of the mobile device that allows input, wherein the native layer keyboard is connected to the hidden native text field via a native-web layer API, wherein the native layer keyboard is capable of displaying a suggestion button, comprising an OTP code generated by an authenticator, wherein an interaction with the suggestion button populates the hidden native text field with the OTP code; and
         upon a detection by the native-web layer API of the OTP code in the hidden native text field, populate, via the native-web layer API, the text web field with the OTP code in the hidden native text field.

2. The mobile device of claim 1, wherein the processor, by executing the hybrid mobile application, is further caused to:
   upon a determination by the native-web layer API, that the text web field is populated by the OTP code, pass the OTP code via a web-server API, to an application server for the hybrid mobile application; and
   upon a determination by the application server that the OTP code satisfies the multifactor authentication process, permit the user to use the first app feature of the hybrid mobile application.

3. The mobile device of claim 1, wherein the processor, by executing the hybrid mobile application, is further caused to:
   examine a paste buffer of the mobile device to determine if it contains a stored code;
   upon a determination that the paste buffer contains a stored code, determine whether the stored code in the paste buffer meets predefined OTP code requirements; and
   upon a determination that the stored code is the OTP code that meets the predefined OTP code requirements, populate, via the native-web layer API, the text web field with the OTP code.

4. The mobile device of claim 3, wherein the processor, by executing the hybrid mobile application, is further caused to:
   upon detection of the OTP code in the hidden native text field, consume the OTP code from the paste buffer, to disable it from being pasted again.

5. The mobile device of claim 3, wherein the processor, by executing the hybrid mobile application, is further caused to:
   responsive to the determining that the paste buffer does not contain a stored code, or that the stored code does not meet the predefined OTP code requirements, detect at least one key press input on the native layer keyboard;
   receive the at least one key press input in the hidden native text field, via the native-web layer API; and
   populate, via the native-web layer API, the text web field with the at least one key press input received by the hidden native text field.

6. The mobile device of claim 1, wherein the first app feature comprises at least one of a user application login, a transaction request, and changing user login IDs or passwords.

7. The mobile device of claim 1, wherein the OTP code comprises at least one of a numeric code, an alphanumeric code, and a 6-digit numeric code.

8. The mobile device of claim 1, wherein the authenticator comprises at least one of an inbuilt native authenticator, and a third party authenticator.

9. The mobile device of claim 1, wherein the authenticator automatically provides the native layer keyboard the OTP code to be displayed by the suggestion button.

10. The mobile device of claim 1, wherein the hidden native text field is tagged to enable it to accept an input of the OTP code.

11. A method for native and web layer integration to authenticate a user to access a first app feature of a hybrid mobile application comprising:
   customizing a hidden native text field designed to accept OTP input;
   presenting a non-interactive text web field on a display of a mobile device, wherein direct interaction with the text web field by a web keyboard is disabled;

presenting a native layer keyboard on a display of the mobile device that allows input, wherein the native layer keyboard is connected to the hidden native text field via a native-web layer API, wherein the native layer keyboard is capable of displaying a suggestion button, comprising an OTP code generated by an authenticator, wherein an interaction with the suggestion button populates the hidden native text field with the OTP code; and upon a detection by the native-web layer API of the OTP code in the hidden native text field, populating, via the native-web layer API, the text web field with the OTP code in the hidden native text field.

12. The method of claim 11, further comprising:

upon a determination by the native-web layer API, that the text web field is populated by the OTP code, passing the OTP code via a web-server API, to an application server for the hybrid mobile application; and upon a determination by the application server that the OTP code satisfies a multifactor authentication process, permitting the user to use the first app feature of the hybrid mobile application.

13. The method of claim 11, further comprising:

examining a paste buffer of the mobile device to determine if it contains a stored code;

upon a determination that the paste buffer contains a stored code, determining whether the stored code in the paste buffer meets predefined OTP code requirements; and upon a determination that the stored code is the OTP code that meets the predefined OTP code requirements, populating, via the native-web layer API, the text web field with the OTP code.

14. The method of claim 13, further comprising:

upon detection of the OTP code in the hidden native text field, consuming the OTP code from the paste buffer, to disable it from being pasted again.

15. The method of claim 13, further comprising:

responsive to the determining that the paste buffer does not contain a stored code, or that the stored code does not meet the predefined OTP code requirements, detecting at least one key press input on the native layer keyboard;

receiving the at least one key press input in the hidden native text field, via the native-web layer API; and populating, via the native-web layer API, the text web field with the at least one key press input received by the hidden native text field.

16. The method of claim 11, wherein the first app feature comprises at least one of a user application login, a transaction request, and changing user login IDs or passwords.

17. The method of claim 11, wherein the OTP code comprises at least one of a numeric code, an alphanumeric code, and a 6-digit numeric code.

18. The method of claim 11, wherein the authenticator comprises at least one of an inbuilt native authenticator, and a third party authenticator.

19. The method of claim 11, wherein the authenticator automatically provides the native layer keyboard the OTP code to be displayed by the suggestion button.

20. The method of claim 11, wherein the hidden native text field is tagged to enable it to accept an input of the OTP code.

21. A non-transitory computer-readable storage medium having embodied thereon a program, the program executable by a processor to perform a method for native and web layer integration to authenticate a user to access a first app feature of a hybrid mobile application comprising:

customizing a hidden native text field designed to accept OTP input;

presenting a non-interactive text web field on a display of a mobile device, wherein direct interaction with the text web field by a web keyboard is disabled;

presenting a native layer keyboard on a display of the mobile device that allows input, wherein the native layer keyboard is connected to the hidden native text field via a native-web layer API, wherein the native layer keyboard is capable of displaying a suggestion button, comprising an OTP code generated by an authenticator, wherein an interaction with the suggestion button populates the hidden native text field with the OTP code;

upon a detection by the native-web layer API of the OTP code in the hidden native text field, populating, via the native-web layer API, the text web field with the OTP code in the hidden native text field; and upon a determination by the native-web layer API, that the text web field is populated by the OTP code, passing the OTP code via a web-server API, to an application server for the hybrid mobile application.

22. The non-transitory computer-readable storage medium of claim 21, wherein the program executable by the processor to perform the method further comprises:

examining a paste buffer of the mobile device to determine if it contains a stored code;

upon a determination that the paste buffer contains a stored code, determining whether the stored code in the paste buffer meets predefined OTP code requirements;

upon a determination that the stored code is the OTP code that meets the predefined OTP code requirements, populating, via the native-web layer API, the text web field with the OTP code;

upon detection of the OTP code in the hidden native text field, consuming the OTP code from the paste buffer, to disable it from being pasted again;

responsive to the determining that the paste buffer does not contain a stored code, or that the stored code does not meet the predefined OTP code requirements, detecting at least one key press input on the native layer keyboard;

receiving the at least one key press input in the hidden native text field, via the native-web layer API;

populating, via the native-web layer API, the text web field with the at least one key press input received by the hidden native text field; and upon a determination by the application server that the OTP code satisfies a multifactor authentication process, permitting the user to use the first app feature of the hybrid mobile application.

\* \* \* \* \*